Dec. 23, 1952 T. H. MANN ET AL Re. 23,602

MAGNETIC SOUND RECORD

Original Filed April 20, 1948

INVENTORS

THEODORE H. MANN
THEODORE G. MANN
BY
Minor R. Hartmann
ATTORNEY

Reissued Dec. 23, 1952 Re. 23,602

UNITED STATES PATENT OFFICE 23,602

MAGNETIC SOUND RECORD

Theodore H. Mann and Theodore G. Mann, Los Angeles, Calif., assignors to Sound Engineering, Hollywood, Calif., a partnership Original No. 2,581,765, dated January 8, 1952, Serial No. 22,078, April 20, 1948. Application for reissue July 5, 1952, Serial No. 297,414

6 Claims. (Cl. 274—41.4)

Matter enclosed in heavy brackets [ ] appears in the original patent but forms no part of this reissue specification; matter printed in italics indicates the additions made by reissue.

This invention relates to magnetic sound recording and in particular to a form for the face of the record base upon which a magnetic recording may be recorded and reproduced without the use of any driving mechanism for moving the head across the face.

Magnetic recording has many advantages over other recording methods but its general use has been restricted heretofore by the fact that magnetic recording materials in the usual form such as wire or tape or plain surfaced discs or cylinders require specialized driving mechanism to advance the recording or playing head on the spiral or helix. Heretofore, it has not been possible to use in connection with magnetic recordings, the existing recording and play-back equipment which is commonly available in phonograph record players because in these the pointed stylus follows a pre-formed spiral or helical groove and does not require a cross feeding mechanism such as that required in magnetic recordings on, for example, plain discs.

The principal object of this invention is to provide a surface on a disk or cylinder adapted for magnetic recording which can be recorded or played by utilizing available phonograph equipment upon which there has been substituted a magnetic type recording or play-back head.

In accordance with this invention, a magnetic recording base is made up in disk or cylinder form similar in size to ordinary phonograph records of these types and is provided with a spiral groove of special saw toothed cross-sectional shape, which is engaged by the contacting foot of the translating magnetic head, which is shaped on one side to ride in the bottom of the groove and against the steeper wall of the groove, while the other side of the foot passes closely adjacent the longer and flatter wall of the groove surface, on which flatter wall the magnetic record is impressed.

The recording base may be made in a number of ways depending on the characteristics of the particular structural material used, the standard of quality desired in the recording and reproduction and in the type of service for which the recording is to be used.

The invention will be described in relation to a grooved disk type recording base, although any form of continuous curved groove type bases such as disks or cylinders may also be used, reference being made to the accompanying drawings in which.

Figure 1:
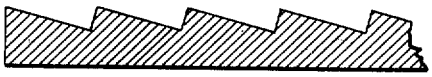
Fig. 1 is an enlarged cross-sectional view showing the saw toothed grooves made in a uniform base material.
Figure 2:
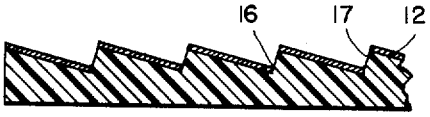
Fig. 2 is an enlarged cross-sectional view showing the saw toothed shaped grooves, the flatter surfaces only having a relatively thin layer of magnetic recording material thereon.

Figure 1 shows a record base of suitable magnetic material throughout in which the spiral saw-toothed grooves are formed either in the pressing of the blanks or by cutting the grooves previous to making the magnetic recording. In Figure 2 is shown a form of my invention in which the record body may be made of any suitable material such as synthetic plastic, glass, ceramic or non-magnetic metals, the flatter wall surface of the saw-toothed groove being coated with a layer 12 of suitable magnetic recording material deposited on or otherwise affixed to the flatter groove face. In this form, the spiral groove with saw-toothed cross-section is preformed on the flat face of the body of the material by any suitable process such as by pressing or by cutting.

One method of forming a record body of the type shown in Figure 2 is to pre-form saw-toothed shaped grooves in a non-magnetizable base; then fill the grooves with a magnetizable coating material, followed by recutting the grooves to leave the magnetizable material only on the flatter wall of the groove. Another method of preparing the record base consists in forming a homogeneous dispersion of magnetic material in a resinous binding and dispersing material such as styrene, vinylite and the like, and then pressing the body in forming dies which impress the saw-toothed grooves in the surface or surfaces. One composition which has been found to be satisfactory for this purpose consists of about 70 parts by weight of ferric oxide powder, 30 parts by weight of styrene, and .5 part by weight of lead stearate.

By using a saw-toothed shaped groove on whose flatter wall the magnetic recording is made, the magnetic head is guided along the pre-formed spiral by the foot 15 which rides in the bottom 16 of the groove and also in the steeper wall 17, which may or may not be covered with magnetic recording material. The foot of the recorder or translating magnet is guided by the steeper wall 17 of the spiral groove so that the translating magnet is carried over the entire length of the spiral groove without mechanical transverse spiral guiding mechanisms. In other words, the ordinary stylus supporting arm of a phonograph which is arranged by suitable pivoted joints to follow a spiral groove by moving in an arc across the disk as the stylus follows the spiral groove may be utilized for supporting the magnetic head, with the specially shaped foot 15 following the bottom of the groove, and with a side thrust against the steeper wall 17.

Figure 3:
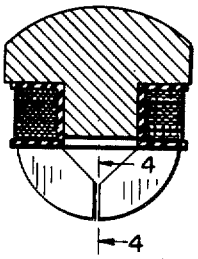
Fig. 3 is a side elevational view of a typical recording or translating magnetic head.
Figure 4:
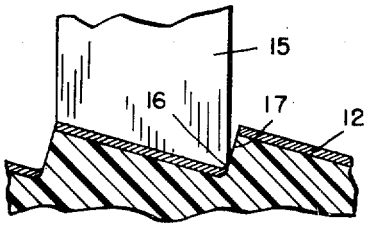
Fig. 4 is a cross-sectional view showing the contacting foot of the recording head in contact with one saw-toothed groove of the record base.

Any suitable type of magnetic recording or translating device having a suitably shaped foot to pass along the saw-toothed shaped grooves may be used. An illustrative translating magnet is shown in Figure 3, with a detailed cross-sectional view of the foot shown in Figure 4.

The magnetizable composition for the recording base, either for the single layer record of Figure 1, or for the double layer form of Figure 2, may consist of any suitable non-magnetic material such as cellulose acetate, vinyl-type plastics, etc., in which there is distributed iron or iron-oxide particles of a kind and in suitable concentration to be effective as a magnetic recording material, following the well known practices of this art.

The advantages of our invention will be apparent. The use of a pre-formed saw-toothed groove, one wall of which serves as the magnetic recording surface and the other wall of which acts to guide the magnetic head in a spiral or helical path, gives a maximum length of recording surface on a given sized disk or cylinder, since no space is required for "lands" between the grooves.

When a record base of the type shown in Figure 2 is used, the undesired echo effect is avoided. Groove echo is the result of spreading the magnetization beyond the desired boundaries, and this is minimized in the saw-toothed groove design because the edges of the magnetizable coating are spaced a maximum distance away from those of the adjoining groove edges. The use of the saw-toothed grooved records facilitates the conversion of the ordinary phonograph player to use magnetic recordings and playings, because no cross-feeding mechanism is required, and the supporting arm of the usual mechanical stylus may be used as a supporting arm for the magnetic head.

Where the expression continuous curved groove is used in this application, both regular and irregular spiral grooves and helical grooves are included.

We claim:

1. A magnetic sound record comprising a continuous solid record base having thereon a continuous [curved] groove of non-equilateral saw-tooth cross-sectional shape, at least one wall surface of said groove being adapted to receive magnetic sound recordings and [the adjacent convolutions of said continuous curved groove] being contiguous at a common edge *with adjacent groove structure of cross-sectional shape and orientation similar to said continuous groove.*

2. A magnetic sound record comprising a continuous solid record base having thereon a continuous curved groove of non-equilateral saw-tooth cross-sectional shape, at least one wall surface of said groove having a coating of magnetic recording material and the adjacent convolutions of said continuous curved groove being contiguous at a common edge.

3. A magnetic sound record comprising a continuous solid record base having thereon a continuous curved groove of non-equilateral saw-tooth cross-sectional shape, at least the wall surface of said groove having the lesser inclination from the horizontal being adapted to receive magnetic sound recordings and the adjacent convolutions of said continuous curved groove being contiguous at a common edge.

4. A magnetic sound record comprising a continuous solid record base having thereon a continuous curved groove of non-equilateral saw-tooth cross-sectional shape, at least the wall surface of said groove having the lesser inclination from the horizontal being provided with a coating of magnetic recording material and the adjacent convolutions of said continuous curved groove being contiguous at a common edge.

5. A magnetic sound record comprising a homogeneous continuous solid record base of magnetic recording material, said base having thereon a continuous curved groove of non-equilateral saw-tooth cross-sectional shape, one wall surface of said groove being adapted to receive magnetic sound recordings and the adjacent convolutions of said continuous curved groove being contiguous at a common edge.

6. A magnetic sound record comprising a homogeneous continuous solid record base of magnetic recording material, said base having thereon a continuous curved groove of non-equilateral saw-tooth cross-sectional shape, the wall surface of said groove having the lesser inclination from the horizontal being adapted to receive magnetic sound recordings and the adjacent convolutions of said continuous curved groove being contiguous at a common edge.

THEODORE H. MANN.
THEODORE G. MANN.

REFERENCES CITED

The following references are of record in the file of this patent:

UNITED STATES PATENTS

| Number | Name | Date |
|---|---|---|
| 907,383 | Lieb | Dec. 22, 1908 |
| 1,074,424 | Fessendon | Sept. 30, 1913 |
| 1,609,540 | Goddard et al. | Dec. 7, 1926 |
| 1,912,887 | Chipman | June 6, 1933 |
| 2,247,847 | Pfleumer | July 1, 1941 |
| 2,381,463 | Potter | Aug. 7, 1945 |